April 13, 1971  G. E. YOCKEY  3,574,589

BENDING AND TEMPERING GLASS SHEETS

Filed Aug. 24, 1966  4 Sheets-Sheet 1

INVENTOR:
GEORGE E. YOCKEY

BY

ATTORNEYS

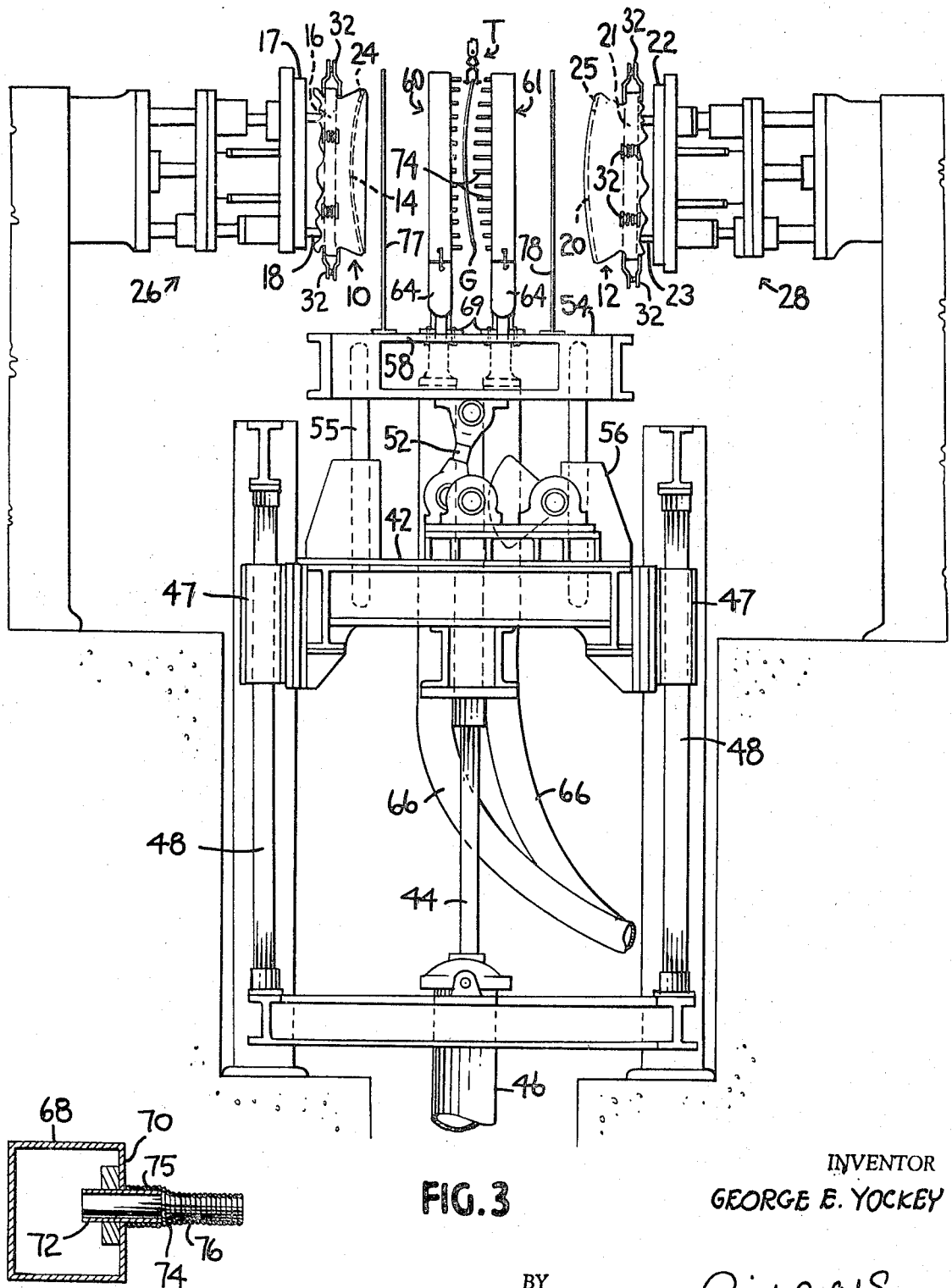

April 13, 1971        G. E. YOCKEY        3,574,589
BENDING AND TEMPERING GLASS SHEETS
Filed Aug. 24, 1966        4 Sheets-Sheet 4
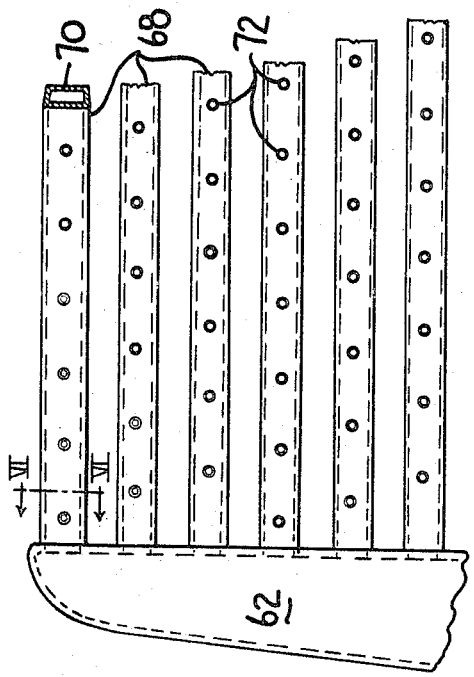
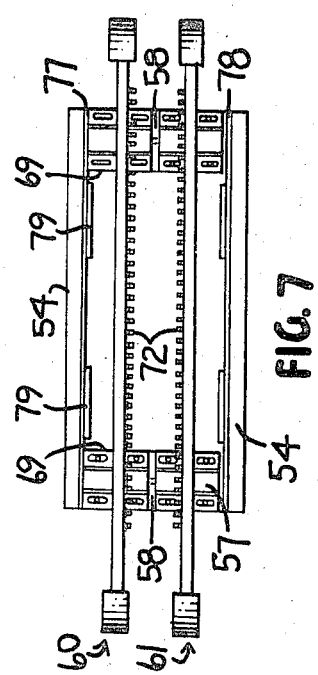
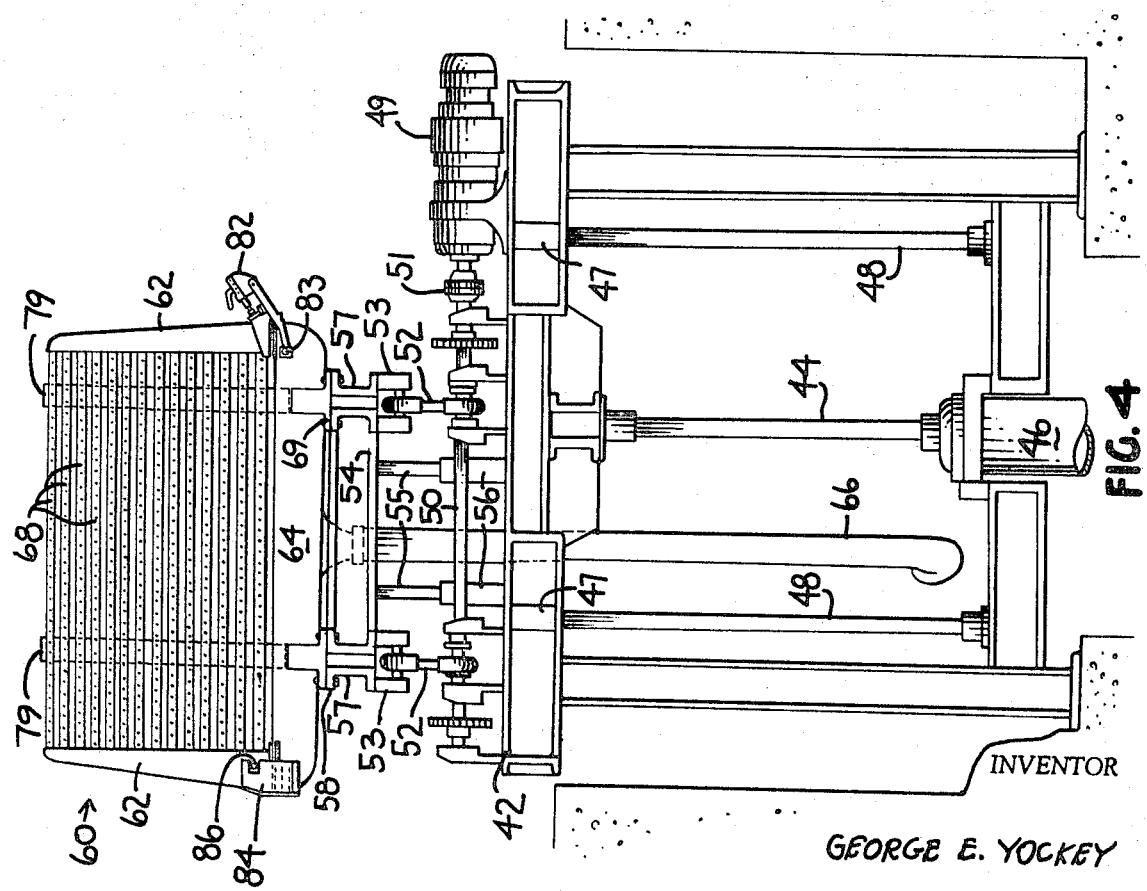
INVENTOR
GEORGE E. YOCKEY
BY
ATTORNEYS

United States Patent Office 3,574,589
Patented Apr. 13, 1971

3,574,589
BENDING AND TEMPERING GLASS SHEETS
George E. Yockey, Crestline, Ohio, assignor to
PPG Industries, Inc.
Filed Aug. 24, 1966, Ser. No. 574,636
Int. Cl. C03b *23/00*
U.S. Cl. 65—268
6 Claims

ABSTRACT OF THE DISCLOSURE

Apparatus for bending and tempering glass sheets comprising a pair of relatively massive glass shaping members having complementary shaping surfaces movable between a glass engaging position and a retracted position, a pair of relatively light glass quenching means movable between a retracted position offset from said glass shaping members and a glass quenching position intermediate said glass shaping members when the latter are retracted. The lightness of the quenching means facilitates its movement and, if desired, its reciprocation, while applying chilling fluid against the surfaces of a newly press bent glass sheet.

---

This invention relates to a method and apparatus for bending and tempering glass sheets.

It is conventional practice to bend flat glass sheets by heating a sheet in a furnace up to near its softening temperature, removing the sheet from the furnace and supporting it at a shaping station intermediate a pair of mutually movable shaping members having shaping surfaces corresponding to the configuration desired for the opposite surfaces of the glass sheet. The shaping members are spaced apart or retracted to allow the heat-softened glass sheet to enter between them. The shaping members are then moved into a glass engaging position wherein the heat-softened glass is sandwiched and held in pressurized engagement between the shaping members for sufficient time to enable the glass sheet to obtain the shape corresponding to that of the shaping surfaces.

After the glass sheet is shaped in such a manner, the shaping members are retracted and the bent sheet is then immediately removed from the glass shaping station and conveyed to a position between a series of nozzles through which air under pressure is imparted in a substantially uniform pattern in the form of streams toward the opposite surfaces of the glass sheet to temper the bent sheet. The term "quenching" is used in the art to describe this air cooling step.

In the process of tempering glass, the glass is provided with a skin having a highly compressive stress which encloses an interior under tension stress. Such compressive stress at the glass surface increases the resistance of the glass to fracturing upon impact. An even distribution of cooling air against the glass surfaces is a prerequisite to uniform tempering and is usually accomplished by blasting the air through a plurality of uniformly spaced nozzles which are moved in a fixed pattern relative to the glass.

When the outer surface or skin of the glass normally stressed in compression is broken, the locked up tension stresses within the glass cause the glass to shatter into a large number of very small pieces having smooth surfaces. The uniformity of size of the shattered particles indicates the uniformity of the temper imparted to the glass. Untempered glass is relatively unsafe because it is more likely to break than tempered glass. When untempered glass breaks, it forms fragments having jagged edges which are very unsafe compared to the smooth surfaces of the relatively small particles or "dice" formed when tempered glass fractures.

It is well known that glass of the soda-lime-silicia type normally used commercially, such as commercial sheet glass, plate glass or float glass, requires to be heated substantially above the strain point in order to insure that a satisfactory temper is imparted to the glass. It is necessary to heat the glass to a higher temperature for adequate tempering than is necessary merely to shape the glass by either gravity sagging or by press bending. For example, a glass temperature of 1080 degrees Fahrenheit is sufficiently hot to press the glass to shape or to sag the glass by gravity to a desired shape provided by an upwardly facing, horizontally disposed outline shaping surface. For adequate tempering, however, a temperature of at least 1150 degrees Fahrenheit must be imparted to the glass at the onset of its sudden chilling.

In the past, when glass was heated within a furnace, and chilled outside the furnace after either a gravity sagging or press bending operation, it was necessary to heat the glass to a temperature of about 1225 degrees Fahrenheit in order to compensate for the cooling that took place before the quenching began. It has been proposed to shape the glass sheet and quench it in the same location where the glass is shaped in order to minimize the time between the completion of the heating step and the onset of the quenching step. Quenching nozzles have been provided in the shaping members for supplying air under pressure to the opposite surfaces of the bent glass after retracting the shaping members, as in U.S. Pat. No. 2,235,969 to White, and nozzles have been provided behind each of a pair of a complementary shaped open shaping grids that shape the heat-softened glass as in U.S. Pat. No. 2,251,159 to Owen and U.S. Pat. No. 3,256,080 to Vranken.

Each of the prior art developments mentioned above has its drawbacks. Blowing air through orifices in shaping members causes rapid wear of shaping member covers required to minimize marking of the surfaces of the bent glass sheets during their press bending. A lack of suitable covers impairs any desirable optical properties of the bent sheets for visual purposes. Furthermore, unless the glass is sandwiched throughout substantially its entire extent between shaping members capable of providing substantially identical heat exchange reactions against the opposite heated surfaces of the glass sheet, the glass is likely to become distorted when it is cooled after its shaping or, if engaged at its margin only during its pressurized shaping, is likely to have its interior portion fail to conform to the desired tolerance.

It has also been proposed in British Pat. No. 699,068 to mount fiber glass or metal screens on flexible frames that are used as movable covers interposed between the surfaces of the heat-softened glass and the shaping surfaces of apertured shaping molds. The shaping molds are retracted and the screens are removed from between the glass and the shaping molds before air is blasted through openings in the shaping molds to temper the bent glass at the shaping station. Unfortunately, it is difficult to prevent fiber glass screens from wrinkling as they conform to the shape of the pressing molds during shaping. This wrinkling imposes a wrinkled pattern in the major surfaces of the glass during the pressing.

Still another suggestion of the prior art to quench the glass at the shaping station is found in South African patent specification 64/3,125. This latter proposal utilizes a pair of glass shaping molds that are movable between a glass engaging position wherein the molds are interposed between a pair of tempering nozzles and the opposite surfaces of a glass sheet and a retracted position wherein the shaping molds are moved out from between the nozzles and the glass to expose the glass directly to the tempering nozzles. However, such an arrangement requires relatively high pressure for the air blasts imposed on the glass, because the nozzles of necessity have to be spaced a sufficiently large distance from the glass to provide clearance for the shaping molds.

The present invention reduces the time which necessarily elapses between the removal of the heat-softened glass sheet from the furnace to the start of the quenching operation wherein the glass is exposed to pressurized blasts of air from the quenching means. Furthermore, the present invention permits successful tempering or quenching without requiring blowers to supply air under as high a pressure as in the South African patented apparatus.

Theoretically, it is possible to lengthen the time which the glass can spend between its removal from the furnace and the beginning of the quenching operation by heating the glass to a higher temperature within the furnace. However, such attempts have not been successful because the glass distorts readily at higher temperatures to such an extent that it is impossible to press out the distortions caused by supporting the glass with solid glass engaging members at elevated temperatures, regardless of whether the glass is supported by gripping its upper edge portion by tongs, by resting its bottom edge portion on a support, or by employing other means such as an outline or skeleton support.

The present invention conserves heat energy within the furnace by reducing the maximum temperature to which the glass sheets need be heated before they are shaped. This is true regardless of the thickness of the glass. However, the invention is particularly suitable for bending and tempering a thin sheet of glass and imparting a high degree of temper to such a thin sheet of glass. The term "thin sheet of glass," as used in this specification means a sheet of glass having a nominal thickness of $3/16$ inch or less, such as the now popular $1/8$ inch thickness.

To accomplish its objective, the present invention provides apparatus for bending and tempering heat-softened glass sheets comprising a pair of relatively massive glass shaping members having opposed shaping surfaces conforming to the shape desired for the opposite surfaces of a bent glass sheet, means attached to said shaping members for moving said shaping members in opposite directions into and out of a glass engaging position, means for supporting a glass sheet in a glass sheet occupying position between said shaping members, conveyor means for moving said glass sheet supporting means into a given position supporting said glass sheet in said glass sheet occupying position for engagement by said glass shaping members and out of said given position when said glass shaping members are out of said glass engaging position, relatively light glass quenching means comprising a frame, a pair of sets of opposed nozzles supported by said frame and located in planes on opposite sides of said glass sheet occupying position, means for supplying fluid under pressure to said nozzles, and means for moving said frames when said shaping members are retracted between a first nozzle position wherein said nozzles oppose said glass sheet occupying position and a second nozzle position wherein said frame is offset from said glass sheet occupying position to provide clearance for moving said glass shaping members into said glass engaging position.

It is preferred, though not absolutely necessary that the apparatus be provided with motion imparting means for moving the frame relative to the glass sheet when fluid is imparted through the nozzles carried by the frame. It is also preferred, but not absolutely necessary that the glass sheet is supported in an upright position, that is, either in a vertical plane or a plane slightly offset from the vertical, and that the frame moving means be constructed and arranged to move the nozzles in a vertical direction upward to the first nozzle position and downward to the second nozzle position.

It is also preferable to have the frame supporting a pair of spaced thin sheets of a material of low heat capacity and impervious to fluid such as thin sheets of aluminum disposed to the rear of each said set of nozzles to be located between said nozzles and said shaping members when the latter are out of said glass engaging position and said frame occupies said first nozzle position. The thin sheets deflect the cold air blasts that rebound from the heated glass sheet and reduce to a substantial degree the cooling of the shaping faces of the shaping members. Therefore, the relatively massive shaping members undergo only slight variations in temperature during and between pressing operations and reach an equilibrium temperature that does not vary unduly shortly after a mass production operation has started. Thus, the shaping members are less likely to be distorted by temperature variations resulting from intermittent contact with hot glass sheets in an environment whose temperature is relatively cold than the relatively light shaping members of the prior art.

In order that the invention may be understood more clearly, a preferred embodiment conforming to the present invention will be described by way of example, with reference to the accompanying drawings in which:

FIG. 3 is a view similar to those of FIGS. 1 and 2 showing the position of the apparatus elements while the shaped glass sheet is undergoing quenching;

FIG. 4 is a fragmentary front elevational view of one of the quenching frames with portions omitted to simplify the disclosure;

FIG. 5 is a fragmentary enlarged detail of a part of the quenching apparatus of FIG. 4;

FIG. 6 is a fragmentary vertical sectional view taken along the line VI—VI of FIG. 5; and FIG. 7 is a fragmentary horizontal sectional view taken along the line VII—VII of FIG. 4 with parts omitted for clarity.

Figure 1:
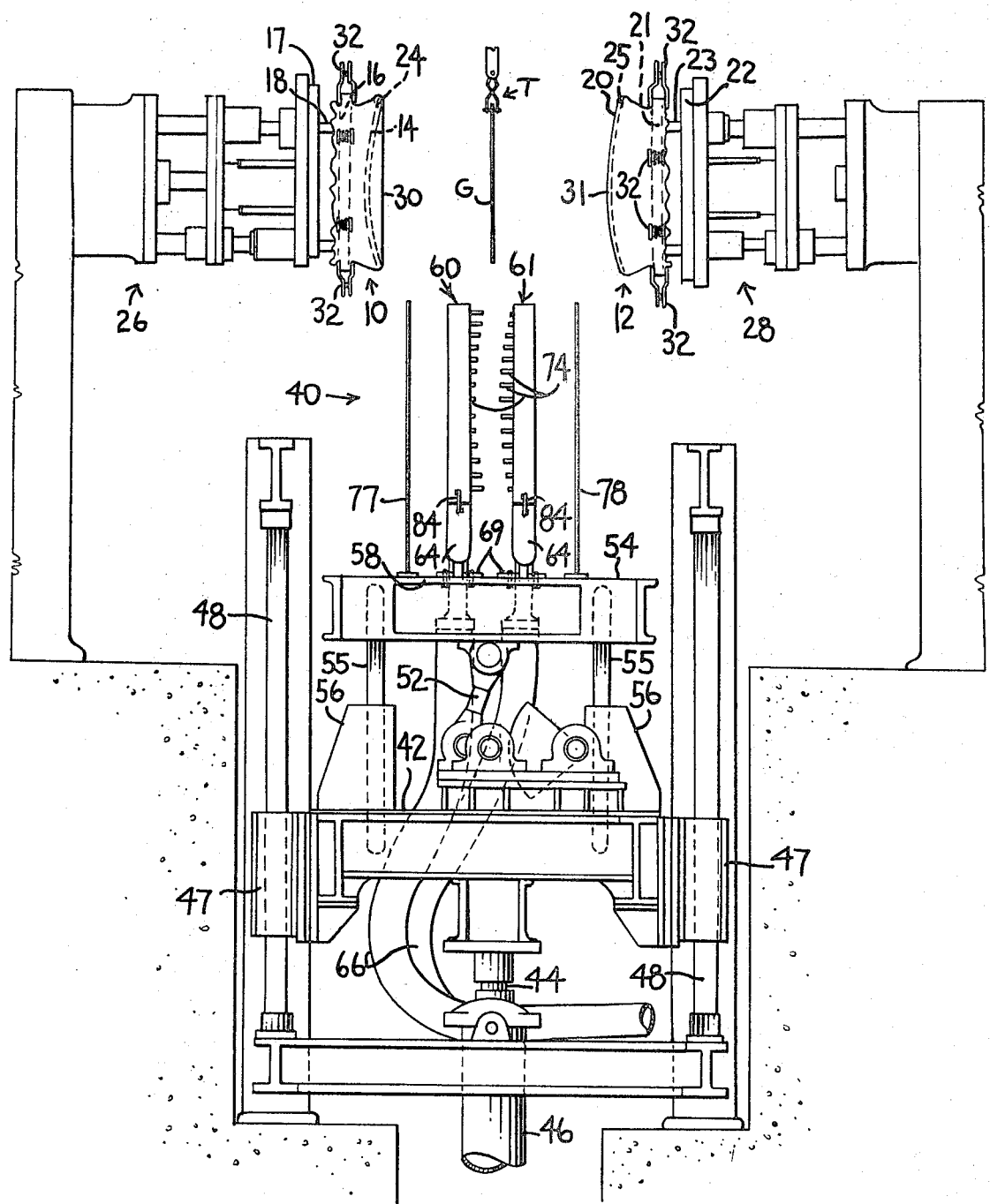
FIG. 1 is an end elevation of apparatus conforming to the present invention with both the glass shaping members and the glass quenching apparatus retracted and a flat glass sheet in its position for the beginning of a cycle of operations.

The drawings show a glass sheet G suspended by tongs T in position for a cycle of operations to be performed by the present apparatus. The tongs are attached to a carriage which is mounted for movement on a conventional overhead conveyor (not shown).

Glass shaping apparatus illustrating the present invention comprises a concave shaping member 10 and a convex shaping member 12. The shaping members have complementary shaping surfaces adapted to conform to the shape desired for the opposite surfaces of the glass sheet G after the latter has been shaped.

The concave shaping member 10 comprises a relatively deformable shaping plate 14 having a concave shaping surface facing one surface of the glass sheet G. A relatively rigid metal plate 16 is disposed in spaced relation behind the relatively deformable shaping plate 14 by a series of spaced attachment means distributed throughout the extent of the plates. A rigid back plate 17 is connected in spaced relation to the rigid metal plate 16 by a plurality of rigid, elongated, adjustable connectors 18.

The convex shaping member 12 comprises a relatively deformable shaping plate 20 having a shaping surface complementary to that of the concave shaping member 10 facing the opposite surface of the glass sheet G. The relatively deformable shaping plate 20 of glass shaping member 12 is attached to a relatively rigid metal plate 21, similar to metal plate 16. Plate 21, in turn, is connected to a back plate 22 (similar to back plate 17) by connectors 23 similar to connectors 18.

Shaping plate 14 is provided with recesses 24 to receive tongs T when the glass is sandwiched between shaping members 10 and 12. Matching recesses 25 are provided on shaping plate 20 and are aligned with recesses 24 to provide chambers to receive the tongs T while the shaping members engage a heat-softened glass sheet to shape the latter in a manner well known in the art.

A piston assembly 26 is connected to the rear of the back plate 17 of the concave shaping member 10. A similar piston assembly 28 is connected to the rear of the back plate 22 of the convex shaping member 12. The pistons are actuated to move toward and away from one another in a manner well known in the art.

A cover 30 of stretchable knit fiber glass cloth is secured over the shaping face of the shaping member 10 and a similar cover 31 is provided for shaping member 12. The covers 30 and 31 are preferably of a material that does not harm glass at elevated temperatures. This is why a material such as a stretchable fiber glass cloth composed of texturized yarn is chosen. A series of clamps 32 are mounted around the periphery of the relatively rigid metal plates 16 and 21 to clamp each of the covers 30 and 31 in position where they are in unwrinkled condition over the shaping surfaces of the respective shaping members 10 and 12. The stretchability of the glass cloths 30 and 31 enables them to conform to the shaping surfaces when the glass sheet G is sandwiched therebetween in pressurized engagement.

The structure of the glass shaping members described hereinabove is that described and claimed in U.S. Pat. No. 3,367,764 of Samuel L. Seymour. Further details may be found in the aforesaid application, which details are incorporated in the present application by reference.

A typical apparatus for bending glass sheets up to thicknesses of ¼ inch illustrating the present invention comprised relatively deformable plates constructed of ¼ inch thick hot rolled steel plates previously bent to approximately the shape desired for the glass sheet. The relatively rigid metal plates 16 and 21 were slightly larger in area than the shaping plates of the relatively deformable shaping plates 14 and 20 and were formed of ½ inch thick plates of cold rolled No. 1018 carbon steel. The latter imparted stiffness and rigidity to the entire assembly.

While the terms "relatively deformable" and "relatively rigid" have been used to describe the metal plates of the shaping members, it is understood that the rigidity and the deformability of the metal plates are described with respect to one another and that the relatively deformable metal plates are substantially rigid in the direction of their thickness compared with the rigidity of a heat-softened glass sheet.

Figure 2:
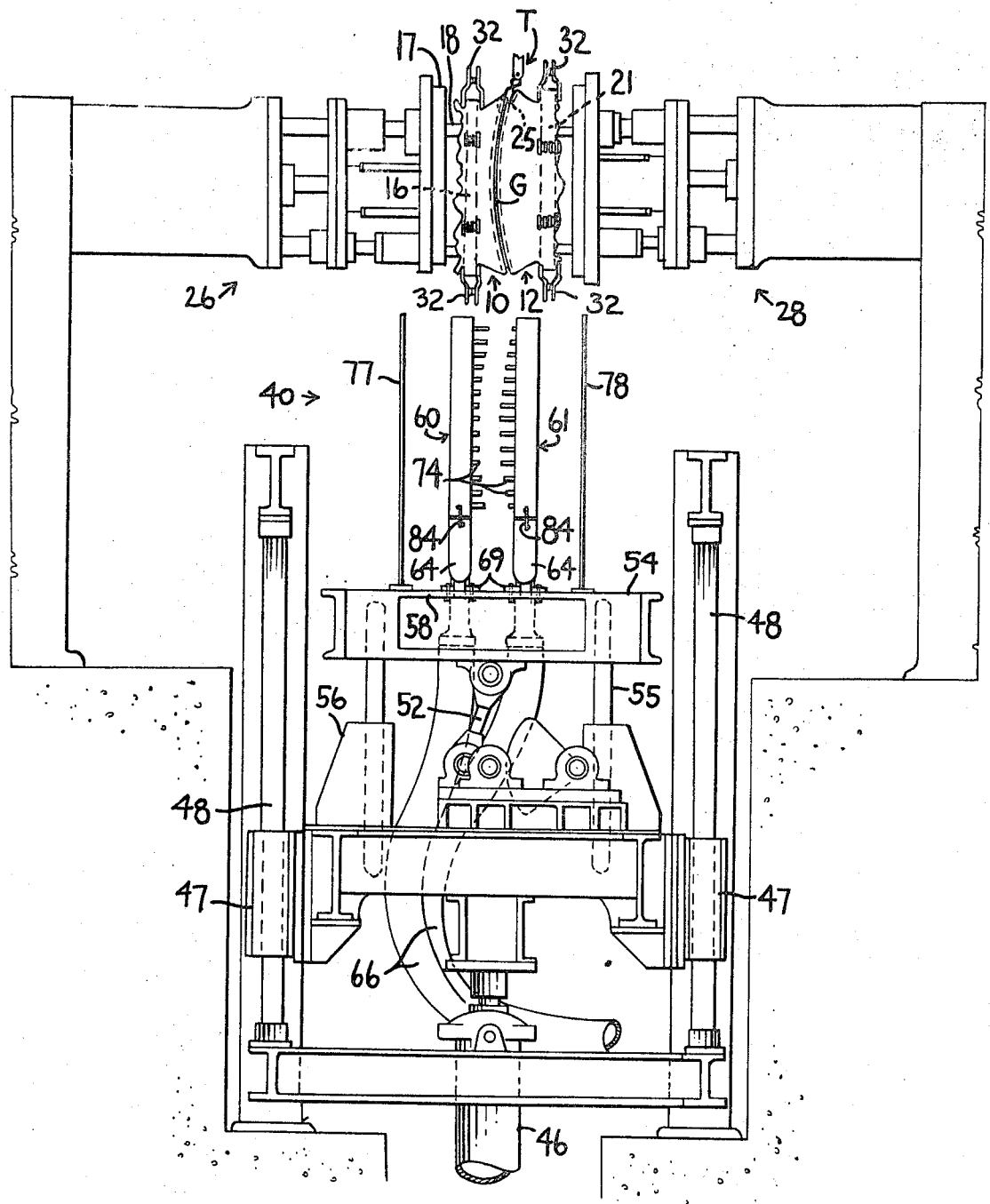
FIG. 2 is a view similar to FIG. 1 taken at an intermediate state of the bending and quenching cycle after the glass has been shaped and held in pressurized engagement between a pair of shaping members.

In FIG. 1 the shaping members 10 and 12 are shown in retracted position to enable a glass sheet G to be transported by tongs T into position between the shaping members. In FIG. 2, the glass sheet G is in pressurized engagement between the shaping members for a period sufficient to shape the glass to the desired configuration. The time necessary to impart the desired permanent shape to the glass depends upon its heat treatment immediately before shaping, its thickness and its chemical composition. For example, in a typical operation for bending commercial float glass sheets of nominal ¼ inch thickness, glass sheets were conveyed through a tunnel-like furnace for about four and one-half minutes to reach a temperature of about 1220 degrees Fahrenheit. The glass sheets, suspended by tongs, were pressed between shaping members and held in position for between 4 and 6 seconds. The shaping members were then retracted, and the glass sheets quenched.

The quenching apparatus, shown generally by reference number 40, comprises a lower platform 42, attached to a piston assembly 44 so that movement of the latter regulates the vertical position of the platform. The piston assembly 44 is guided for vertical movement by a vertically oriented piston housing 46. Sleeve-like brackets 47 extend horizontally outward from the lower platform 42 and are slidably mounted on vertical guides 48 to insure movement of the lower platform and its supported structure in a vertical direction in response to vertical movement of the piston assembly 44.

The lower platform 42 supports a motor 49 which is coupled to a drive shaft 50 through a speed reducer 51 (FIG. 4). Eccentric drives 52 are pivotally mounted along the drive shaft 50 and have their upper ends pivoted to downwardly extending bifurcated brackets 53 that are rigidly attached to a horizontal frame 54.

The frame 54 has depending posts 55 that slide in vertical sleeves 56 that serve as guides to insure that the frame 54 and its attached structures reciprocate linearly in unison in a vertical direction in response to movement of the eccentric drives 52 when actuated by motor 49 through drive shaft 50 and speed reducer 51. The frame 54 also includes a pair of horizontally extending I-beams 57 having apertures (FIG. 7) in their upper flanges 58 along the length of each I-beam. The apertures are arranged in pairs so that each aperture of each pair is transversely aligned with the other aperture of the pair and the pairs of apertures form a pair of parallel rows of longitudinally spaced apertures.

The frame 54 supports a pair of nozzle housings 60 and 61. Each nozzle housing comprises a pair of horizontally spaced air delivery conduits 62 extending vertically upward from their lower ends which form rounded corners with a common horizontal duct 64. A flexible delivery hose 66 supplies air under pressure to each common horizontal duct 64 from a compressor (not shown).

The vertical air delivery conduits 62 of each nozzle housing are interconnected by a series of air supply pipes 68 that extend horizontally therebetween.

The pipes 68 are of square cross-section and apertured along the length of their inner walls 70 (FIG. 6) that face a major surface of a glass sheet G when the latter is quenched. The apertures are equally spaced along the length of the nozzle wall 70. Each aperture receives a nozzle 72. Hollow extensions 74 of various length may be attached to the ends of nozzles 72. The nozzle extensions 74 are so arranged that their free ends are located substantially equal distances from the adjacent major surface of a bent glass sheet supported in position for quenching.

The vertical air delivery conduits 62 have diminishing cross-section from their lower ends to their upper ends. In addition, the upper ends form rounded corners with the uppermost of the air supply pipes 68. This arrangement causes a more uniform flow of air under pressure from the vertical air delivery conduits 62 to each of the air supply pipes 68.

If the cross-section of conduits 62 were uniform along their vertical length, it would be difficult to supply an equal rate of air flow to each air supply pipe. Furthermore, flowing air under pressure in an upward direction through vertical air delivery conduits whose outer walls converge toward the ends of the air supply pipes imparts a component of motion to the moving air in the direction of the lengths of the air supply pipes.

Having air moving along the length of the air supply pipes 68 from both ends toward their center tends to equalize the rate of air flow toward the glass along the length of each air supply pipe 68. Since the nozzle extensions 74 are so arranged that each nozzle extension terminates to provide an orifice at about the same distance from a glass surface as every other nozzle extension, the substantially uniform rate of flow through each nozzle results in a substantially uniform rate of air impingement at each glass surface portion swept by air blasting through each nozzle.

The nozzles 72 along each air supply pipe 68 are separated by the same distance from one another along the length of each air supply pipe 68 but are offset relative to the nozzles of adjacent air supply pipes. By correlating the rate of air flow, nozzle orifice to glass distance, spacing between nozzles and the displacement of the nozzle housings, the hot bent glass can be quenched at a uniform rate throughout its entire extent.

A typical quenching apparatus used in performing the present invention has the horizontal air supply pipes 68 formed of 1 inch square light weight aluminum tubing spaced 1 inch apart from one another in a vertical direction. The apertures along each inner wall 70 have a uniform inner diameter of ⅜ inch and are equally spaced from one another by a center to center distance of 2 inches measured along a horizontal line midway of the height of the pipe 68. The vertical distance between the horizontal lines connecting the centers of apertures in adjacent pipes is also 2 inches. However, the apertures in adjacent pipes are aligned along oblique lines passing through their centers to form an angle of about 15 degrees with the vertical.

Each nozzle housing 60 and 61 is supported on a pair of slotted brackets 69 (FIG. 4). The slots in each of the brackets 69 are aligned with the apertures in the upper flanges 58 of I-beams 57.

The eccentric drives 52 move in orbits having 3 inch radii. Thus, the nozzle housings 60 and 61 are reciprocated vertically with a displacement of 6 inches.

The nozzles 72 are 1 inch lengths of pipe having an outer diameter of ¼ inch and an inner diameter of 3/16 inch. The pipes are externally threaded to lock nuts and are arranged to extend from ½ inch inside each air delivery pipe 68 to ½ inch beyond the apertured wall 70 that faces a glass sheet surface. A flexible closed spring 74 having an enlarged end portion 75 with an inner diameter of ¼ inch that fits over each nozzle 72 and a narrow extension portion 76 having an inner diameter of 3/16 inch that extends beyond each nozzle is one embodiment of nozzle extension 74. Other suitable materials for the nozzle extension are neoprene hose, silicone rubber hose and other air impervious tubing that can stand close proximity to the heated glass.

The plenum chambers are disposed so that the nozzle orifices are spaced between 3⅛ inches and 5⅛ inches from one another. The nozzle orifice to glass distance can be equalized by using different lengths of nozzle extensions 74 or by adjusting the position of the slotted brackets 69 lengthwise of the apertures 58. The slots in the slotted brackets extend parallel to one another in a horizontal plane normal to a vertical plane intersecting the nozzle housings 60 and 61.

In a typical quenching operation, the glass was heated in a furnace until it reached a surface temperature of about 1225 degrees Fahrenheit and was immediately moved to a position between the pair of glass shaping members that pressed against the opposite surface of the heat-softened glass and held the glass for at least 2 seconds in pressurized engagement. The shaping members were then retracted and air at a plenum pressure of 25 pounds per square inch blown through the nozzles for 4 seconds. The glass sheet was removed from between the nozzle housings and passed between a conventional cooler while subjected to additional cooling by air blasts at a plenum pressure of 6 pounds per square inch. The nozzle housings were lowered and the apparatus reset for another cycle of operation.

In order to reduce the effect of the air blasts cooling the shaping faces of the shaping members 10 and 12 when the latter are retracted and the air is blasted against the glass sheet, a further aspect of the present invention suggests that a thin sheet of a material of low heat capacity and impervious to fluid blasts be disposed to the rear of each set of nozzles and located between the nozzles and the shaping members when the latter are retracted from their glass engaging position and the frames oppose the glass occupying position. In the illustrative embodiment of the present invention, thin aluminum plates 77 and 78 are supported on vertical supports 79 behind a respective nozzle housing 60 or 61. The thin plates 77 and 78 are disposed in vertical planes which are preferably spaced at least 6 inches behind the adjacent nozzle housing 60 or 61.

The nozzle housings 60 and 61 may be made of unitary construction. However, to facilitate fabrication, the upper portion of each nozzle housing may be fabricated separately from the common horizontal duct 64 and the two parts secured by a clamp 82 pivoted to the horizontal duct 64 at a pivot pin 83, and a bracket 84 carried by the upper wall of the horizontal duct 64. The bracket 84 is slotted to receive a pin 86 extending outward from one of the vertical air delivery conduits 62.

In securing the parts of the nozzle housings to form a unitary structure, the clamp 82 is released by pivoting it downward about pivot pin 83 and the upper portion of the nozzle housing 60 or 61 to be secured to the common horizontal duct 64 is placed above the duct 64 with pin 86 fitting loosely within the slot of the slotted bracket 84. Clamp 82 is then pivoted upward to fit the pin 86 securely within the slot of the slotted bracket 84. This aligns the lower ends of the vertical air delivery conduits 62 with the ends of the horizontal duct 64.

The form of the invention shown and described in this disclosure represents an illustrative preferred embodiment of the novel features thereof. The furnace, the subsequent cooling apparatus and the limit switch arrangements that may be included to control the operation are well known to those skilled in the art and a description of such well known devices would only make the present description prolix as it is not necessary to instruct those skilled in the art. It is understood, however, that various modifications, such as heating and cooling cycles, omission of additional cooling, etc., may be made without departing from the spirit of the invention as defined by the claimed subject matter that follows.

What is claimed is:

1. Apparatus for bending and tempering heat-softened glass sheets comprising:
    (A) a pair of relatively massive glass shaping members having sufficient mass to maintain a stable equilibrium temperature that does not vary unduly upon intermittent contact with hot glass during a mass production operation and opposed shaping surfaces conforming to the shape desired for the opposite surfaces of a bent glass sheet,
    (B) means attached to said shaping members for moving said shaping members in opposite directions into and out of a glass engaging position,
    (C) means for supporting a glass sheet in a glass sheet occupying position between said shaping members.
    (D) conveyor means for moving said glass sheet supporting means into a given position supporting said glass sheet in said glass sheet occupying position and out of said glass sheet occupying position when said glass shaping members are out of said glass engaging position,
    (E) relatively light glass quenching means comprising
        (E1) a frame,
        (E2) a pair of sets of opposed nozzles supported by said frame and located in planes on opposite sides of said glass sheet occupying position,
        (E3) means for supplying fluid under pressure to said nozzles, and
        (E4) means for moving said frame when said shaping members are retracted between a first nozzle position wherein said nozzles oppose said glass sheet occupying position and a second nozzle position wherein said frame is offset from said glass sheet occupying position to permit holding said glass sheet in pressurized engagement between said glass shaping members for a predetermined period and then immediately moving said glass shaping members out of said glass engaging position to permit returning said frame from said second nozzle position to said first nozzle position when said glass shaping members are spaced from one another a sufficient distance to provide clearance for said frame.

2. The improvement as in claim 1, further including motion imparting means for moving said frame relative to said glass sheet a limited distance to either side of said first position when said frame occupies said first position and fluid is imparted through said nozzles.

3. The improvement as in claim 1, wherein said glass sheet is supported in an upright position and said frame moving means is constructed and arranged to move said nozzles in a vertical direction upward to said first nozzle position and downward to said second nozzle position.

4. The improvement as in claim 1, wherein said frame also supports a thin sheet of a material of low heat capacity and impervious to fluid blasts disposed to the rear of each said set of nozzles and located between said nozzles and said shaping members when the latter are retracted from said glass engaging position and said frames occupy said first position.

5. The improvement as in claim 1, wherein hollow extensions are attached to each of said nozzles, said hollow extensions being of different individual lengths so chosen that their free inner ends lie in curved surfaces at substantially equal distances from an opposed curved surface of a press bent glass sheet when the latter occupies said glass sheet occupying position, said frame occupies said first nozzle position and said glass shaping members are spaced from one another said sufficient distance to provide clearance for said frame.

6. The improvement as in claim 5, further including motion imparting means for reciprocating said frame a limited distance to either side of said first position, whereby the distances between said free ends of said nozzle extensions and said opposed curved surface do not differ by an amount sufficient to cause the tempering pattern imparted to the bent glass sheet to depart significantly from that desired.

References Cited
UNITED STATES PATENTS 3,256,080  6/1966  Vranken _____ 65—104
3,367,763  2/1968  Pickavance et al. _____ 65—287

HOWARD R. CAINE, Primary Examiner

S. R. FRIEDMAN, Assistant Examiner

U.S. Cl. X.R.

65—287, 348